(12) United States Patent
Barrowman et al.

(10) Patent No.: US 11,741,206 B2
(45) Date of Patent: Aug. 29, 2023

(54) SECURE ELECTRONIC DEVICES AND METHODS

(71) Applicant: VeriFone, Inc., Wilmington, DE (US)

(72) Inventors: John Henry Barrowman, Knoxville, TN (US); Santhosh Kumar Gillella, Naperville, IL (US)

(73) Assignee: VeriFone, Inc., Wilmington, DE (US)

( * ) Notice: Subject to any disclaimer, the term of this patent is extended or adjusted under 35 U.S.C. 154(b) by 157 days.

(21) Appl. No.: 17/156,197

(22) Filed: Jan. 22, 2021

(65) Prior Publication Data

US 2022/0237270 A1    Jul. 28, 2022

(51) Int. Cl.
H04L 29/06       (2006.01)
G06F 21/32       (2013.01)
H04W 84/12       (2009.01)
H04L 9/40        (2022.01)

(52) U.S. Cl.
CPC .............. *G06F 21/32* (2013.01); *H04L 63/20* (2013.01); *H04W 84/12* (2013.01)

(58) Field of Classification Search
None
See application file for complete search history.

(56) References Cited

U.S. PATENT DOCUMENTS

| 9,450,983 | B2 * | 9/2016 | Huang | H04L 63/102 |
|---|---|---|---|---|
| 9,590,857 | B2 * | 3/2017 | Lee | H04L 41/12 |
| 9,817,958 | B1 * | 11/2017 | McCorkendale | H04L 63/20 |
| 10,936,291 | B1 * | 3/2021 | Gamliel | G06F 8/72 |
| 2007/0176741 | A1 * | 8/2007 | Montenegro | H04W 12/06 340/5.82 |
| 2013/0189953 | A1 * | 7/2013 | Mathews | G01S 5/02521 455/411 |
| 2017/0070380 | A1 * | 3/2017 | Bajpai | H04L 41/0631 |
| 2017/0171170 | A1 * | 6/2017 | Sun | H04L 9/088 |

(Continued)

OTHER PUBLICATIONS

Li, Jian-po et al. Wireless Fingerprint Attendance System Based on ZigBee Technology. 010 2nd International Workshop on Intelligent Systems and Applications. https://ieeexplore.ieee.org/stamp/stamp.jsp?tp=&arnumber=5473360 (Year: 2010).*

(Continued)

*Primary Examiner* — Jeremiah L Avery
(74) *Attorney, Agent, or Firm* — Bond, Schoeneck & King, PLLC (57) ABSTRACT

Secure electronic devices and methods are disclosed. A method may include: using a transceiver, a computer program capturing a current connectivity fingerprint comprising at least one current wireless network or device in a current environment for an electronic device; the computer program retrieving a home connectivity fingerprint for a home environment comprising at least one home wireless network or device that fingerprint was captured when the electronic device was in a home environment; the computer program comparing the current connectivity fingerprint to the home connectivity fingerprint; and the computer program storing the current connectivity fingerprint in response to a threshold number of the current wireless networks or devices in the current connectivity fingerprint are not present of the home connectivity fingerprint.

20 Claims, 4 Drawing Sheets

(56) References Cited

U.S. PATENT DOCUMENTS

2019/0108363 A1\* 4/2019 Caldwell ............. G06F 21/6245
2020/0008254 A1\* 1/2020 Beck ................... H04W 72/542

OTHER PUBLICATIONS

Radu, Valentin et al. Pazl: A mobile crowdsensing based indoor WiFi monitoring system. roceedings of the 9th International Conference on Network and Service Management (CNSM 2013). https://ieeexplore.ieee.org/stamp/stamp.jsp?tp=&arnumber=6727812 (Year: 2013).\*

Naik, R. et al. Potential of Reconfigurable Digital Backend in UWB Receiver for Wireless Sensor Network. 2007 3rd International Conference on Intelligent Sensors, Sensor Networks and Information. https://ieeexplore.ieee.org/stamp/stamp.jsp?tp=&arnumber=4496846 (Year: 2007).\*

Arye, Matvey et al. A formally-verified migration protocol for mobile, multi-homed hosts. 012 20th IEEE International Conference on Network Protocols (ICNP). https://ieeexplore.ieee.org/stamp/stamp.jsp?tp=&arnumber=6459961 (Year: 2012).\*

The International Search Report and the Written Opinion of the International Searching Authority, International Patent Application No. PCT/US22/13356, pp. 1-9, dated Apr. 18, 2022.

\* cited by examiner

SECURE ELECTRONIC DEVICES AND METHODS

BACKGROUND OF THE INVENTION

1. Field of the Invention

The present disclosure relates generally to secure electronic devices and methods.

2. Description of the Related Art

For many types of electronic devices, especially those that collect sensitive information such as such as account numbers, personal identification numbers (PINs), etc., attackers often seek to modify the electronic device so they can capture the sensitive information for the attacker. Because the modifications can be complicated, these attacks often require the electronic device to be taken to an environment that has the necessary equipment to perform them. After the modifications are complete, the electronic device is usually returned to its normal operating environment so that it can capture sensitive information for the attacker.

SUMMARY OF THE INVENTION

Secure electronic devices and methods are disclosed. In one embodiment, a method for providing security for an electronic device may include: (1) a computer program executed by a computer processor in an electronic device capturing a current connectivity fingerprint for a current environment using a transceiver, the current connectivity fingerprint comprising at least one current wireless network or device detected by the transceiver; (2) the computer program retrieving, from a memory, a home connectivity fingerprint for a home environment comprising at least one home wireless network or device, wherein the home connectivity fingerprint was captured when the electronic device was in a home environment; (3) the computer program comparing the current connectivity fingerprint to the home connectivity fingerprint; and (4) the computer program storing the current connectivity fingerprint in response to the current connectivity fingerprint and the home connectivity fingerprint differing from each other, wherein the current connectivity fingerprint and the home connectivity fingerprint differ from each other when a threshold number of the current wireless networks or devices in the current connectivity fingerprint are not present of the home connectivity fingerprint.

In one embodiment, the home wireless network may include a RF network such as a WiFi network, a cellular network, a Bluetooth network, etc. The home wireless network device may include a RF device such as a beacon, a RF transmitter, etc.

In one embodiment, the computer program may capture the current connectivity fingerprint for the current environment periodically, in response to the computer program identifying an event involving the electronic device, such as the electronic device being powered on, the electronic device being unplugged from a power source and operating on battery power, the electronic device being disconnected from a network cable, the electronic device receiving an improper password, the electronic device being tampered with, the electronic device being opened, etc., and others.

In one embodiment, the method may further include the computer program performing an action in response to the current connectivity fingerprint and the home connectivity fingerprint differing from each other. Example actions include increasing a rate of capturing current wireless network fingerprints for the current environment, communicating a message to a backend that the electronic device has been removed from the home environment, entering a standby mode that prevents execution of transactions or operations, displaying a warning message, etc.

In one embodiment, the method may further include the computer program performing a post-removal action in response to the current connectivity fingerprint and the home connectivity fingerprint matching each other. Example post-removal actions include exiting a standby mode in response to entry of a password, displaying a warning message, communicating the stored current connectivity fingerprint to a backend, etc.

In one embodiment, the method may further include the computer program capturing a current Global Navigation Satellite System (GNSS) or Global Positioning Service (GPS) location for a current environment.

According to another embodiment, an electronic device may include at least one computer processor a transceiver, a memory; and a computer program stored in memory and executed by the at least one computer processor. The computer program may: (1) capture a current connectivity fingerprint for a current environment using the transceiver, the current connectivity fingerprint comprising at least one current wireless network or device detected by the transceiver; (2) retrieve a home connectivity fingerprint for a home environment from the memory, the home connectivity fingerprint comprising at least one home wireless network or device, wherein the home connectivity fingerprint was captured when the electronic device was in a home environment; (3) compare the current connectivity fingerprint to the home wireless network fingerprint; and (4) store the current connectivity fingerprint in response to the current connectivity fingerprint and the home connectivity fingerprint differing from each other, wherein the current connectivity fingerprint and the home connectivity fingerprint differ from each other when a threshold number of the current wireless networks or devices in the current connectivity fingerprint are not present in the home wireless network fingerprint.

In one embodiment, the home wireless network may include a RF network such as a WiFi network, a cellular network, a Bluetooth network, etc. The home wireless network device may include a RF device such as a beacon, a RF transmitter, etc.

In one embodiment, the computer program may perform an action in response to the current connectivity fingerprint and the home connectivity fingerprint differing from each other. Example actions include increasing a rate of capturing current wireless network fingerprints for the current environment, communicating a message to a backend that the electronic device has been removed from the home environment, entering a standby mode that prevents execution of transactions or operations, displaying a warning message, etc.

In one embodiment, the computer program may perform an action in response to the current connectivity fingerprint and the home connectivity fingerprint differing from each other. Example actions include increasing a rate of capturing current wireless network fingerprints for the current environment, communicating a message to a backend that the electronic device has been removed from the home environment, entering a standby mode that prevents execution of transactions or operations, displaying a warning message, etc.

In one embodiment, the computer program may perform a post-removal action in response to the current connectivity fingerprint and the home connectivity fingerprint matching each other. Example post-removal actions include exiting a standby mode in response to entry of a password, displaying a warning message, communicating the stored current connectivity fingerprint to a backend, etc.

In one embodiment, the electronic device may include a GNSS/GPS sensor, and the computer program may capture a current GNSS/GPS location for a current environment.

According to another embodiment, a method for providing security for an electronic device performed by a backend computer program, the backend computer program executed by a processor in a backend, the program may include: (1) receiving, from an electronic device, a home connectivity fingerprint for a home environment of the electronic device, the home connectivity fingerprint comprising at least one of a home wireless network and a device detected by a transceiver in the electronic device; (2) storing the home connectivity fingerprint in a backend memory; (3) receiving a current connectivity fingerprint in response to a determination by the electronic device that the current connectivity fingerprint and the home connectivity fingerprint differ from each other, wherein the current connectivity fingerprint and the home connectivity fingerprint differ from each other when the current wireless networks or devices in the current connectivity fingerprint are not present of the home connectivity fingerprint; and (4) communicating a message to a user of the electronic device comprising at least the current connectivity fingerprint In one embodiment, the method may further include the backend computer program blacklisting the electronic device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for providing security for electronic devices.

Figure 1:
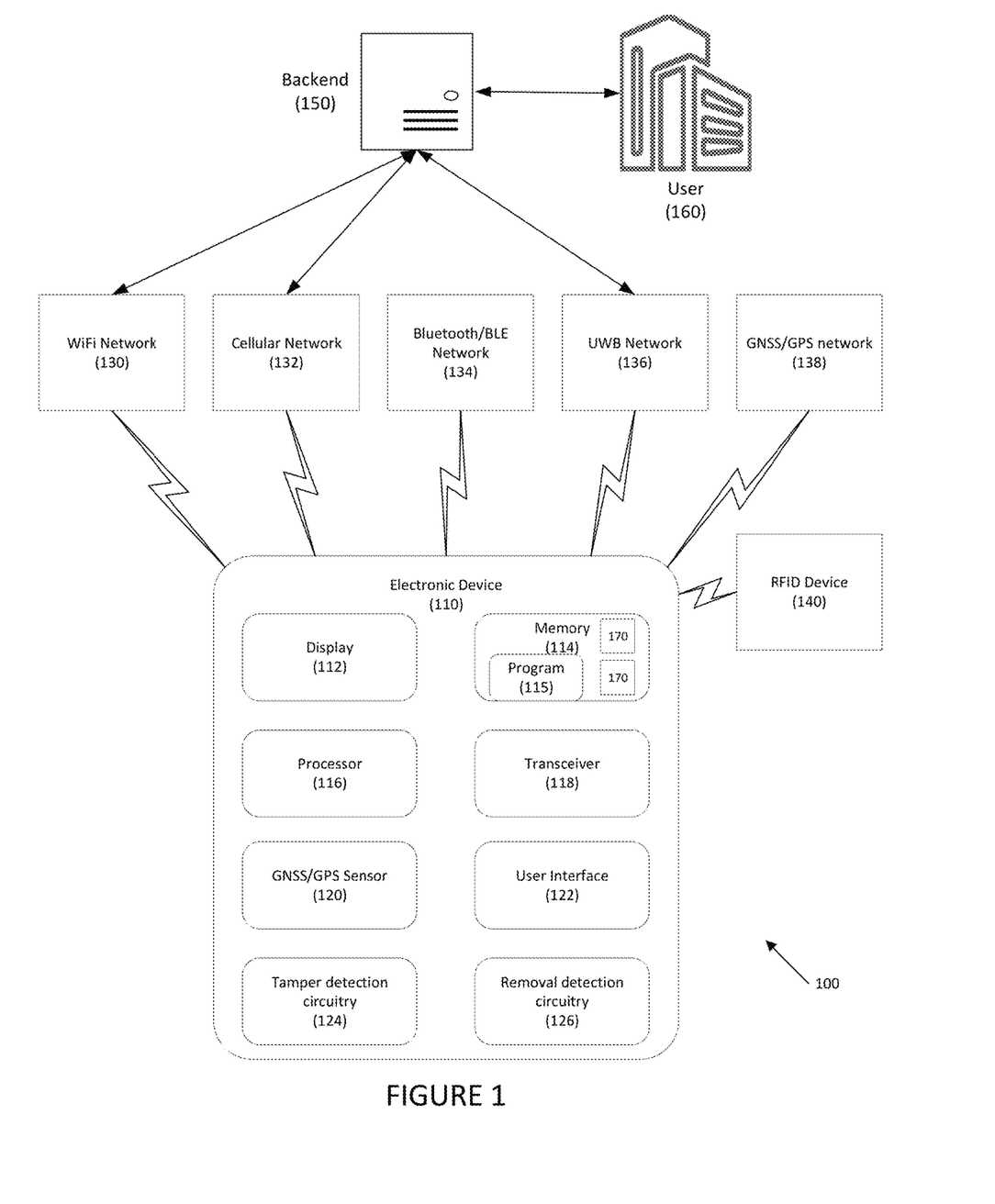
FIG. 1 depicts a system for providing security for an electronic device according to one embodiment.

Referring to FIG. 1, a block diagram of a system for providing security to an electronic device is depicted according to an embodiment. System 100 may include electronic device 110, which may include display 112, memory 114, processor 116, transceiver 118, Global Navigation Satellite System (GNSS)/Global Positioning System (GPS) sensor 120, user interface 122, tamper detection circuitry 124, and removal detection circuitry 126. Electronic device 110 may be any suitable electronic device. For example, electronic device 110 may include payment terminals, secure displays, encrypting pin pads (EPPs), secure card readers (SCRs), or any other suitable electronic device that may receive credit or debit card information, personal identification numbers, financial information, and/or other sensitive information. Other electronic devices 110 may receive sensitive information such as, social security numbers, dates of birth, passwords, and any other identifying information. Any suitable information may be received by electronic device 110 as is necessary and/or desired.

In one embodiment, display 112 may display information regarding a status of electronic device 110, such as battery level, security status (e.g., secure/normal, compromised, locked, etc.), network connectivity information, as well as data associated with the normal operation of electronic device 110. Display 112 may further be configured to display specific information depending on whether an attack is detected or not, such as warnings, etc.

Memory 114 may store one or more computer programs 115 that may be executed by processor 116, such as computer program 115 to detect, store, and compare connectivity fingerprints. Memory 114 may store home connectivity fingerprint 170, described below, for a home environment for electronic device 110, as well as connectivity fingerprints 170 for other environments for electronic device 110 as is necessary and/or desired. In one embodiment, the home environment may be the normal operating environment for the device (e.g., a merchant location, such as a store). In one embodiment, electronic device 110 may have more than one home environment, and each home connectivity fingerprint 170 for each home environment may be saved in memory 114.

In one embodiment, home connectivity fingerprint 170 may be stored with a timestamp for the time when home connectivity fingerprint 170 was captured.

In one embodiment, computer program 115 may cause the electronic device to capture its GNSS/GPS location from GNSS/GPS network 138 using GNSS/GPS sensor 120 and to store the GNSS/GPS location in memory 114. The GNSS/GPS location for the home environment may be stored as part of home connectivity fingerprint 170.

In one embodiment, memory 114 may store data related to the operation of electronic device 110, such as encryption keys, sensitive data, personal information, sensitive functions, cardholder data, other computer programs (not shown), etc.

Processor 116 may control the operation of electronic device 110, and may execute computer program 115 stored in memory 114. Processor 116 may be any suitable computer processor, including microprocessors, micro-controllers, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other suitable device or arrangement of devices.

In one embodiment, a plurality of processors 116 may be provided as is necessary and/or desired.

Transceiver 118 may include one or more transceiver that may interface with one or more RF communication networks or devices. For example, transceiver 118 may communicate with and/or identify one or more WiFi networks 130, one or more cellular networks 132, one or more Bluetooth or BLE networks or devices 134, one or more ultra-wideband networks 136, one or more RFID devices 140, etc. Any other suitable RF network, protocol, or devices may be used as is necessary and/or desired.

In one embodiment, network information or device information, such as network identifiers, device identifiers, etc. for any of these networks or devices may be captured and stored in memory 114 as a connectivity fingerprint. Examples of identifiers that may be detected include the service set identifier (SSID) and/or Basic Service Set Identifier (BSSID)/MAC identifiers for WiFi network 130, identifiers for cellular network 132 and other network information including, for example, cell identifiers, Reference Signals Received Power (RSRP), Reference Signals Received Quality (RSRQ), identifiers for devices in Bluetooth and/or Bluetooth Low Energy (BLE) networks 134 (e.g., BSSID/MAC identifiers, Bluetooth identifiers, etc.), transmitter identifiers in ultra-wideband network 136, identifiers for RFID devices 140 (e.g., BSSID/MAC identifiers), etc. Depending on the network type, computer program 115 may measure the signal strength of the detected network and may determine an approximate distance of electronic device 110 from the source of the network (e.g., the distance of electronic device 110 from a BLE beacon in BLE network 134 may be determined based on the signal strength of the BLE network detected at electronic device 110, the distance of electronic device 110 from a cell tower may be determined using RSRP and RSRQ, using Enhanced Cell ID, time of flight and angle of arrival, etc.).

In one embodiment, information for a wired connection (e.g., a LAN) may also be captured.

Electronic device 110 may further include user interface 122, which may be a keypad, touchscreen, touchpad, wired or wireless interface to communicate with a user electronic device, etc. In one embodiment, a user may provide instructions to control the operation of the computer program via user interface 122. A user may further access a stored home or current connectivity fingerprint via user interface 122, via a dongle, etc.

Electronic device 110 may further include tamper detection circuitry 124 which may include, for example, case open switches, anti-tampering meshes, etc.

Electronic device 110 may further include removal detection circuitry 126 which may include, for example, one or more switch located on an exterior surface of electronic device 110, etc. Removal detection circuitry 126 may detect when electronic device 110 is remove from a mount or cradle (not shown), or similar.

In one embodiment, electronic device 110 may use the receipt of a RF signal to indicate whether electronic device 110 has been removed and/or returned to its home environment. For example, a RF tag (not shown) may be affixed to, integrated within, or otherwise provided for electronic device 110, and a RF reader (not shown) may detect electronic device 110 leaving or returning to its home environment. In one embodiment, the RF tag (not shown) may be embedded in electronic device 110, may be emulated by hardware in electronic device 110 (e.g., by computer program 115 and transceiver 118), etc.

System 100 may further include backend 150. Backend 150 may be associated with the location (e.g., a merchant), with the manufacturer of electronic device 110, or a third party. Backend 150 may include at least one computer processor (not shown), a memory (not shown) and may be based on the cloud, on a physical device, combinations thereof, etc. In one embodiment, electronic device 110 may communicate with backend 150 via any suitable network, such as WiFi network 130, cellular network 132, ultra-wideband network 136, etc. In one embodiment, electronic device may communicate with backend 150 at least in part using a wired (e.g., LAN) connection (not shown).

Backend 150 may execute a backend computer program that may receive and store home connectivity fingerprint 170 for electronic device 110. It may further receive and store current connectivity fingerprints for electronic device 110, and may communicate with user 160, such as the merchant, a business, an individual, etc. that is operating electronic device 110.

In one embodiment, electronic device 110 may communicate one or more connectivity fingerprints 170 (e.g. the current connectivity fingerprint, a stored connectivity fingerprint captured at an earlier time, etc.) to backend 150 periodically (e.g., hourly, daily, etc.), when a current and/or past connectivity fingerprint detected by electronic device 110 does not match a stored home connectivity fingerprint for the home location, or as otherwise necessary and/or desired. For example, electronic device 110 may wait until a suitable network is available before communicating to backend 150.

In one embodiment, the current and/or past connectivity fingerprints may be accessed from electronic device 110 using, for example, a dongle. In another embodiment, computer program 115 may communicate the current and/or past connectivity fingerprint by any suitable messaging protocol, including email, SMS messaging, etc.

In one embodiment, electronic device 110 may also communicate a status (e.g., locked, secured, compromised, etc.) and current and/or past GNSS/GPS location of electronic device 110 to backend 150.

In another embodiment, electronic device 110 may store the current and/or past connectivity fingerprints, GNSS/GPS information, etc. in memory 114 and this information may be retrieved from electronic device directly via user interface 122 or in any other sufficient manner.

Figure 2:
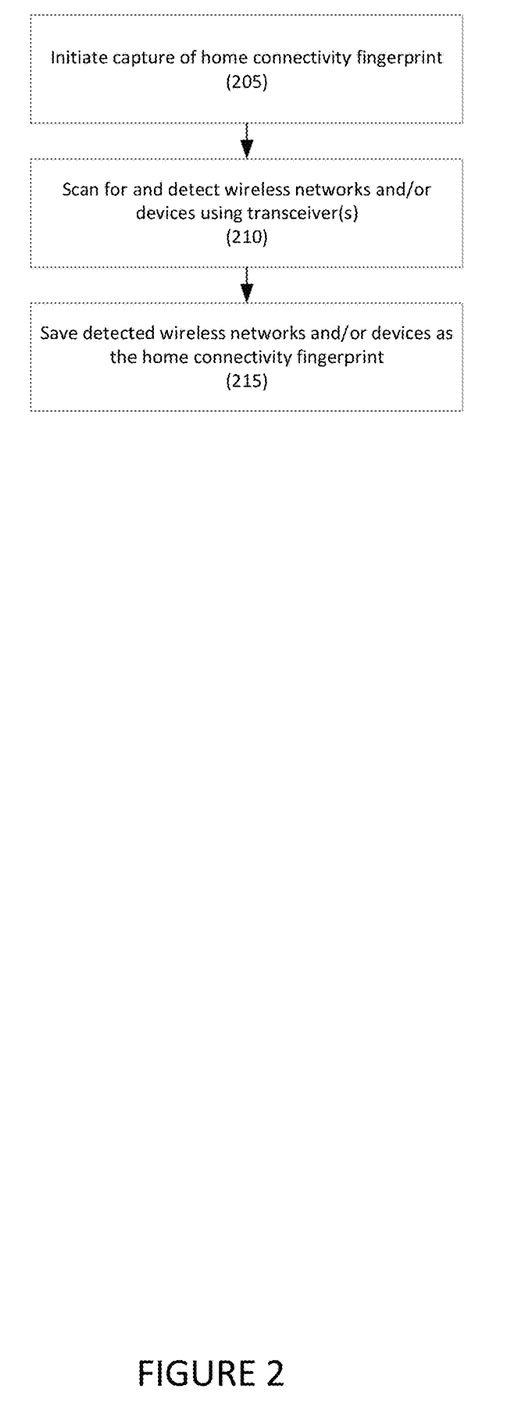
FIG. 2 depicts a method for detecting and storing a home connectivity fingerprint according to one embodiment.

Referring to FIG. 2, a computer-based method for detecting and storing a home connectivity fingerprint is disclosed according to one embodiment. In step 205, a computer program executed by a processor in an electronic device that is deployed in a home environment, such as the normal operating environment for the electronic device (e.g., a merchant location), may initiate the capture of a home connectivity fingerprint for the electronic device's home environment that captures the various devices and networks the electronic device may connect with. In one embodiment, the computer program may receive a command, such as from a user interface, over a network, etc. to scan for and detect information for wireless networks and/or devices that can be detected by one or more transceiver.

In step 210, the computer program may capture the home connectivity fingerprint using the at least one transceiver, such as by scanning or "sniffing" the home environment for RF signals. For example, the computer program may capture information from wired and wireless networks and wireless devices in the home environment, such as network identifiers, device identifiers, etc. that are detected by the at least one transceiver. Examples of wireless networks and devices include RF networks, such as WiFi networks, cellular networks, ultra-wideband networks, Bluetooth networks and/or devices, etc.

In one embodiment, the home connectivity fingerprint may be captured over a period of time (e.g., hours, days, etc.) to identify which wireless networks and/or devices are temporarily present (e.g., a cellular phone that may be present in one connectivity fingerprint but not in the other(s)) and which are not (e.g., they are "noise"). In one embodiment, the devices may be present, but the connections may not be (e.g., a Bluetooth on a cellular phone may be turned off). For example, wireless networks or devices that are not present during a scan for networks and/or devices for a certain number of captures (e.g., only present in one capture) may not be included in the home connectivity fingerprint so that those wireless networks or devices are not used to determine whether the electronic device is located in its home environment.

In one embodiment, the computer program may also capture a home GNSS/GPS location of the electronic device. The computer program may also receive the home GNSS/GPS location of the electronic device from one or more devices communicating with the electronic device. For example, the electronic device may not be equipped with a GNSS/GPS transceiver and may instead receive geographic location from another device.

In step 215, the computer program may save the home connectivity fingerprint to the memory of the electronic device with a timestamp. In one embodiment, the computer program may communicate the home connectivity fingerprint to a backend.

Figure 3:
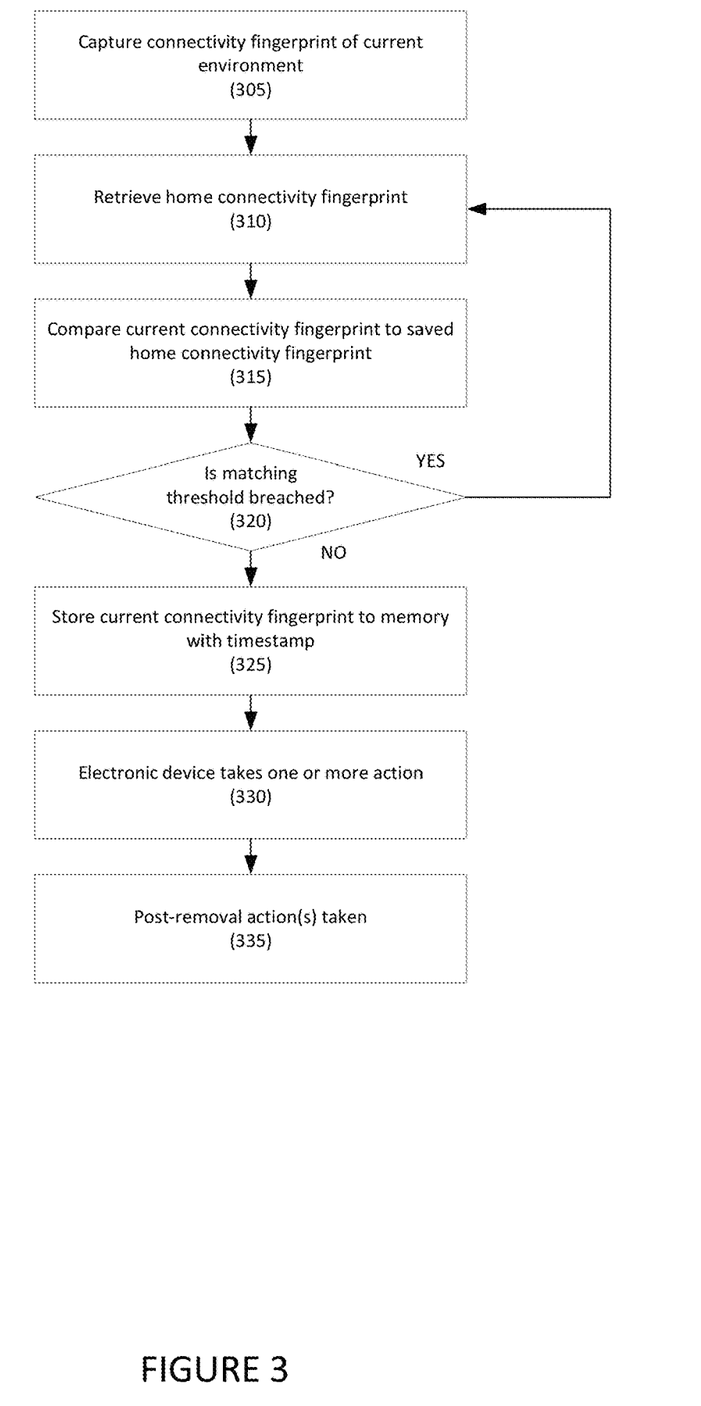
FIG. 3 depicts a method for monitoring a current environment for an electronic device and taking a necessary security action according to one embodiment.

Referring to FIG. 3, a method for monitoring a current environment for an electronic device and taking a necessary security action is provided according to one embodiment.

In step 305, periodically, or as otherwise necessary and/or desired, the computer program on the electronic device may capture a current connectivity fingerprint of a current environment for the electronic device. This may be performed in the same or in a similar manner as capturing the home connectivity fingerprint. The current environment may be different from the home environment if, for example, the electronic device was removed to a different location for nefarious purposes. In one embodiment, the electronic device may capture the same type of wireless networks and wireless device information (e.g., network and/or device identifiers WiFi networks, cellular networks, Bluetooth networks and devices, etc.) that was captured in the connectivity fingerprint for the home environment.

In one embodiment, the computer program may capture GNSS/GPS location information for the electronic device using, for example, a GNSS/GPS sensor. In another embodiment, the computer program may receive the GNSS/GPS location information for the electronic device from another device such as, for example, a base station of a cellular network in communication with the electronic device.

In one embodiment, the computer program on the electronic device may capture the current connectivity fingerprint hourly, several times a day, etc. It may also capture the current connectivity fingerprint at times where it is more likely to be removed from the home location, such as during non-business hours. It may also capture the current connectivity fingerprint in response to the computer program identifying an event, such as when the electronic device is powered on, when the electronic device has been unplugged from a power source and is operating on battery power, when the electronic device has been disconnected from a network cable, when an improper password is entered a threshold number of times, when a notification of suspected tampering is received from, for example, tamper detection circuitry, removal detection circuitry, etc., when the electronic device is opened, when movement is detected (e.g., by one or more accelerometer, gyroscope, etc.), when the electronic device is roaming (e.g., when it is connected to a different WiFi network), etc.

In step 310, the computer program may retrieve the home connectivity fingerprint from memory.

In step 315, the computer program may compare the current connectivity fingerprint to the home connectivity fingerprint. If, in step 320, a matching threshold is met (e.g., a certain number of wireless networks and/or devices present in both the current connectivity fingerprint and the home connectivity fingerprint), the computer program may deduce that the electronic device is physically in the home environment and no action is taken. The computer program may continue to capture connectivity fingerprint in step 210 as is necessary and/or desired.

In one embodiment, the matching threshold may require one network in the current connectivity fingerprint to be present in the home connectivity fingerprint. Other matching thresholds may be used as is necessary and/or desired.

In one embodiment, the computer program may also compare a current GNSS/GPS location to the GNSS/GPS location stored with the home connectivity fingerprint as part of the comparison. In one embodiment, GNSS/GPS location comparison may be used with or without connectivity fingerprint comparison as is necessary and/or desired.

If the certain matching threshold is not met, in step 325, the computer program may store the current connectivity fingerprint in memory and may continue to capture and store current connectivity fingerprints periodically. This may indicate that the electronic device is en route to, or in an attacker's facility.

In one embodiment, the computer program may increase the rate of capturing current connectivity fingerprints. For example, the computer program may capture the current connectivity fingerprint every 15 minutes, hourly, etc. In another embodiment, the computer program may decrease the rate of capturing current connectivity fingerprints in order to conserve battery life. In one embodiment, if the computer program identifies that the electronic device is moving (e.g., consecutive current connectivity fingerprints differ from each other), the computer program may further increase the rate of capture until two consecutive current connectivity fingerprints are substantially the same.

In one embodiment, if the electronic device is not on battery power, and the GNSS/GPS Satellites Carrier/Noise ratio is good, the rate at which the GNSS/GPS location is captured may be increased to, for example, 1 second intervals to provide 1 second location fixes and precise location tracking.

The rate at which current connectivity fingerprints are captured may be set as is necessary and/or desired.

In one embodiment, each current connectivity fingerprint may be stored as a record with a timestamp.

In step 330, the computer program may perform one or more actions. For example, the computer program may communicate a message or notification indicating that it has been removed to a backend using, for example, an available WiFi network, a cellular network, etc. In embodiments, the computer program may also communicate one of more of the current connectivity fingerprints to the backend. Any other information may be communicated to the backend as is necessary and/or desired.

In one embodiment, the computer program may not be able to communicate with the backend until a connection is available (e.g., an open WiFi network is available, a cellular network is accessible, etc.). Thus, in addition to capturing current connectivity fingerprints, the computer program may separately identify one or more available wireless networks for communicating with the backend.

In one embodiment, the computer program may operate such that it communicates with the backend when the current connectivity fingerprint indicates that the electronic device has been returned to its home environment. In another embodiment, the computer program may operate such that it will attempt to communicate with the backend by any available communication network.

The computer program may also perform one or more security actions to be performed, such as erasing encryption keys, erasing any secure data, putting the device in a standby mode that prevents the execution of transactions or operations until a password is entered, displaying a warning message, changing its energy consumption from a battery (e.g., a coin battery) to drain the battery more quickly, etc. Any suitable security actions may be executed as is necessary and/or desired.

In one embodiment, the actions may be based on a security mode for the electronic device, such as stealth mode and a warning mode. For example, during device configuration, the computer program may present an option to select a mode for the electronic device in response to the matching threshold being breached, and the computer program may select the appropriate action(s) to take for that mode. In stealth mode, because the individual that removed the electronic device from the home environment is less likely to return the electronic device to the home environment if he or she knows that removal has been detected, the computer program may select actions that may include capturing the connectivity fingerprints, but may not select any action that provides an indication to the individual that the computer program has taken any actions.

Conversely, in the alert mode, the computer program may select action(s) that provide an indication to the individual that the electronic device has been detected, such as by displaying warning messages on the screen.

In one embodiment, if communication with the backend is established, the backend may provide instructions for the computer program to take. For example, based on the data received from the electronic device and the configuration of the electronic device, a manager may issue commands to the computer program, and the computer program may cause those actions to be taken.

In one embodiment, the computer program may require the matching threshold to be breached more than one time before it takes any additional action other than to capturing and storing current connectivity fingerprints. In another embodiment, the computer program may require the matching threshold to be breached for a certain period of time before it takes any additional action(s). For example, the computer program may require that the matching threshold to be breached for an hour before it takes any additional actions. Regardless of the action taken, the computer program may still store the current connectivity fingerprint to memory.

In step 335, once the current connectivity fingerprint matches the home connectivity fingerprint, the computer program may perform one or more post-removal actions. For example, the computer program may display a message that removal of the electronic device was detected and may require a password to be entered before the electronic device will operate. The computer program may further indicate whether tampering was detected. In another embodiment, the computer program may display a warning that removal was detected and recommend that the electronic device be evaluated before it is used. Any other suitable post-removal action may be taken as is necessary and/or desired.

In one embodiment, the stored connectivity fingerprint(s) may be provided to the authorities as is necessary and/or desired. For example, the stored connectivity fingerprints may be downloaded from memory of the electronic device and provided to an authority as is necessary and/or desired.

In one embodiment, the computer program may leave data "breadcrumbs" on any network or device that it accessed when outside of its home environment. For example, the WiFi BSSID/MAC identifier of the electronic device may be registered with any network device that the electronic device may access.

In another embodiment, the computer program may capture information on other devices that are present when it determines that the electronic device is outside of its home environment. For example, the computer program may execute a network monitoring tool, such Tcpdump, Bt-Snoop logs, Packet sniffer, or other similar network monitoring tool, may capture packets from other nearby devices. These network monitoring tools may capture network details, IP addresses, etc. of devices that are connected to the same network as the electronic device. If the electronic device is not connected to a network, the network monitoring tools may still capture certain network details, such as the name of the network, BSSID/MAC identifiers for access points, etc., by "sniffing" the packets being transmitted on the network's frequency.

Embodiments may further capture service discovery packets from network devices, such as printers, etc. The information captured may be used to determining the presence of the electronic device in that environment.

In another embodiment, the electronic device may communicate, via BLE, a message that it has been removed. Any monitoring device that is within the BLE range may receive the message and may take an action, such as reporting the receipt of the message to the backend, the user, etc. Any suitable communication channel may be used as is necessary and/or desired.

Figure 4:
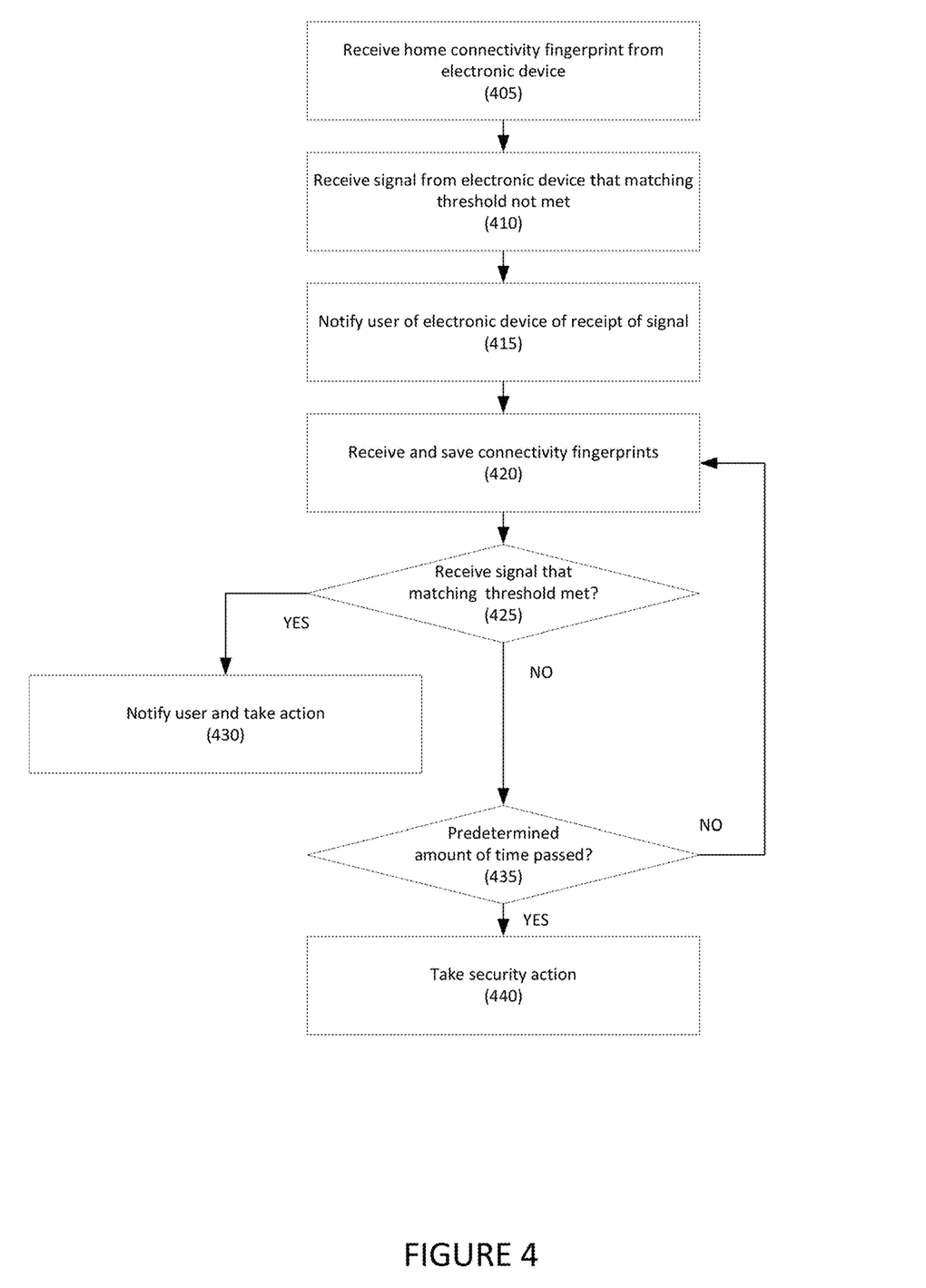
FIG. 4 depicts a method for monitoring electronic device security according to one embodiment.

Referring to FIG. 4 method for monitoring electronic device security is provided according to one embodiment.

In step 405, a backend computer program may receive the home connectivity fingerprint for an electronic device from the electronic device. In one embodiment, the backend may receive the home connectivity fingerprint in any suitable manner, such as over a computer network and may be part of a registration process for the electronic device.

In one embodiment, the receipt of the home connectivity fingerprint may be optional.

In step 410, the backend computer program may receive a signal from the electronic device in response to the electronic device determining that the matching threshold in comparing a current connectivity fingerprint to a home connectivity fingerprint has not been met (e.g., a distress signal). In one embodiment, the signal may also include one or more connectivity fingerprints for the electronic device. Each connectivity fingerprint may include a timestamp.

In one embodiment, the signal may further include one or more GNSS/GPS location for the electronic device, including timestamps.

In one embodiment, the backend computer program may store the connectivity fingerprints.

In step 415, the backend computer program may notify the user of the electronic device (e.g., a merchant or business) of the receipt of the signal from the electronic device. In one embodiment, the backend may further communicate the connectivity fingerprints.

In one embodiment, the backend computer program may communicate a message to the user that the user remove the electronic device from service. In another embodiment, the backend computer program may automatically remove electronic device from service.

In step 420, the backend computer program may continue to receive and save connectivity fingerprints from the electronic device.

If, in step 425, if the backend computer program receives a signal from the electronic device that the matching threshold is met, indicating that the electronic device has been returned to its home environment, in step 430, the backend computer program may inform the user, and may take one more actions, such as communicating a recommendation that the electronic device be visually inspected for signs of tampering, communicating a recommendation that the electronic device be removed from service and repaired, reviewing the captured connectivity fingerprints to determine where the electronic device was, etc.

In one embodiment, the stored connectivity fingerprint(s) may be provided to the authorities as is necessary and/or desired. For example, the stored connectivity fingerprints may be downloaded from memory of the electronic device and provided to an authority as is necessary and/or desired.

If, in step 435, a signal indicating the matching threshold is met is not received, and a predetermined amount of time (e.g., 48 hours, 2 weeks, etc.) has passed since the last communication from the electronic device, in step 440, the backend computer program may take one or more actions, such as blacklisting the electronic device (e.g., identifying the electronic device as untrustworthy), deleting any keys associated with the electronic device, draining the internal battery to cause a tamper condition, notifying the user that the electronic device is considered to be lost, sending the last known location for the electronic device to the user, etc.

If a signal is received after the action(s) are taken, the device may be redeployed.

If the predetermined amount of time has not passed, the backend computer program may continue to collect connectivity fingerprints.

It will be appreciated by persons skilled in the art that the present invention is not limited by what has been particularly shown and described hereinabove. Rather, the scope of the present invention includes both combinations and subcombinations of features described hereinabove and variations and modifications thereof, which are not in the prior art. It should further be recognized that these embodiments are not exclusive to each other.

It will be readily understood by those persons skilled in the art that the embodiments disclosed herein, are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing security for an electronic device, comprising:
   a computer program executed by a computer processor in an electronic device capturing a current connectivity fingerprint for a current environment using a transceiver, the current connectivity fingerprint comprising at least one current wireless network or device detected by the transceiver;
   the computer program retrieving, from a memory, a home connectivity fingerprint for a home environment comprising at least one home wireless network or device, wherein the home connectivity fingerprint was captured when the electronic device was in a home environment;
   the computer program comparing the current connectivity fingerprint to the home connectivity fingerprint;
   the computer program storing the current connectivity fingerprint in response to the current connectivity fingerprint and the home connectivity fingerprint differing from each other, wherein the current connectivity fingerprint and the home connectivity fingerprint differ from each other when a matching threshold relating to a number of the current wireless networks or devices in the current connectivity fingerprint and a number of home wireless networks or devices in the home connectivity fingerprint is breached; and
   the computer program identifying a communication connection outside of the home environment and communicating with a backend computer program of a backend regarding the breached matching threshold using the identified communication connection, wherein the backend computer program is configured to communicate with a user of the electronic device regarding the breached matching threshold.

2. The method of claim 1, wherein the home wireless network comprises at least one RF network selected from the group consisting of a WiFi network, a cellular network, a Bluetooth network.

3. The method of claim 1, wherein the home wireless network device comprises at least one RF device selected from the group consisting of a beacon and a RF transmitter.

4. The method of claim 1, further comprising the computer program capturing at least one further current connectivity fingerprint for the current environment in response to the current connectivity fingerprint and the home connectivity fingerprint differing from each other.

5. The method of claim 1, further comprising the computer program capturing the current connectivity fingerprint for the current environment in response to the computer program identifying an event involving the electronic device.

6. The method of claim 5, wherein the event comprises at least one of the electronic device being powered on, the electronic device being unplugged from a power source and operating on battery power, the electronic device being disconnected from a network cable, the electronic device receiving an improper password, the electronic device being tampered with, and the electronic device being opened.

7. The method of claim 1, further comprising:
   the computer program performing an action in response to the current connectivity fingerprint and the home connectivity fingerprint differing from each other, wherein the action comprises at least one of increasing a rate of capturing current wireless network fingerprints for the current environment, communicating a message to the backend that the electronic device has been removed from the home environment, entering a standby mode that prevents execution of transactions or operations, and displaying a warning message.

8. The method of claim 1, further comprising:
   in response to the electronic device being removed from the home environment and a second current connectivity fingerprint matching the home connectivity fingerprint, the computer program performing a post-removal action comprising at least one of exiting a standby mode in response to entry of a password, displaying a warning message, and communicating the stored current connectivity fingerprint to the backend.

9. The method of claim 1, further comprising the computer program registering identifying information with the communication connection accessed outside of the home environment.

10. An electronic device, comprising:
at least one computer processor;
a transceiver;
a memory; and
a computer program stored in memory and executed by the at least one computer processor, wherein the computer program performs the following:
capture a current connectivity fingerprint for a current environment using the transceiver, the current connectivity fingerprint comprising at least one current wireless network or device detected by the transceiver;
retrieve a home connectivity fingerprint for a home environment from the memory, the home connectivity fingerprint comprising at least one home wireless network or device, wherein the home connectivity fingerprint was captured when the electronic device was in the home environment;
compare the current connectivity fingerprint to the home wireless network fingerprint;
store the current connectivity fingerprint in response to the current connectivity fingerprint and the home connectivity fingerprint differing from each other, wherein the current connectivity fingerprint and the home connectivity fingerprint differ from each other when a matching threshold relating to a number of the current wireless networks or devices in the current connectivity fingerprint and a number of home wireless networks or devices in the home wireless network fingerprint is breached; and
identify a communication connection outside of the home environment and communicate with a backend computer program of a backend regarding the breached matching threshold using the identified communication connection, wherein the backend computer program is configured to communicate with a user of the electronic device regarding the breached matching threshold.

11. The electronic device of claim 10, wherein the home wireless network comprises at least one RF network selected from the group consisting of a WiFi network, a cellular network, a Bluetooth network.

12. The electronic device of claim 10, wherein the home wireless network device comprises at least one RF device selected from the group consisting of a beacon and a RF transmitter.

13. The electronic device of claim 10, wherein the computer program further captures at least one further current connectivity fingerprint for the current environment in response to the current connectivity fingerprint and the home connectivity fingerprint differing from each other.

14. The electronic device of claim 10, wherein the computer program further captures the current connectivity fingerprint for the current environment in response to the computer program identifying an event involving the electronic device.

15. The electronic device of claim 14, wherein the event comprises at least one of the electronic device being powered on, the electronic device being unplugged from a power source and operating on battery power, the electronic device being disconnected from a network cable, the electronic device receiving an improper password, the electronic device being tampered with, and the electronic device being opened.

16. The electronic device of claim 10, wherein the computer program performs an action in response to the current connectivity fingerprint and the home connectivity fingerprint differing from each other, wherein the action comprises at least one of increasing a rate of capturing current wireless network fingerprints for the current environment, communicating to the backend that the electronic device has been removed from the home environment, entering a standby mode that prevents execution of transactions or operations, and displaying a warning message.

17. The electronic device of claim 16, wherein in response to the electronic device being removed from the home environment and a second current connectivity fingerprint matching the home connectivity fingerprint the computer program performs a post-removal action comprising at least one of exiting a standby mode in response to entry of a password, displaying a warning message, and communicating the stored current connectivity fingerprint to backend.

18. A method for providing security for an electronic device performed by a backend computer program, the backend computer program executed by a processor in a backend, the program comprising:
receiving, from an electronic device, a home connectivity fingerprint for a home environment of the electronic device, the home connectivity fingerprint comprising at least one of a home wireless network and a device detected by a transceiver in the electronic device;
storing the home connectivity fingerprint in a backend memory;
receiving a current connectivity fingerprint in response to a determination by the electronic device that the current connectivity fingerprint and the home connectivity fingerprint differ from each other, wherein the current connectivity fingerprint and the home connectivity fingerprint differ from each other when a number of the current wireless networks or devices in the current connectivity fingerprint of when compared to a number of home wireless networks or devices in the home connectivity fingerprint breaches a matching threshold; and
communicating a message to a user of the electronic device comprising at least the current connectivity fingerprint, the message further comprising a recommendation to remove the electronic device from service or take some other action to address a tampering event.

19. The method of claim 18, further comprising blacklisting the electronic device.

20. The electronic device of claim 10, wherein the computer program registers identifying information with the communication connection accessed outside of the home environment.

* * * * *